(12) United States Patent
Boughzala et al.

(10) Patent No.: US 11,032,179 B2
(45) Date of Patent: Jun. 8, 2021

(54) HETEROGENEOUS FLOW CONGESTION CONTROL

(71) Applicant: TELEFONAKTIEBOLAGET LM ERICSSON (PUBL), Stockholm (SE)

(72) Inventors: Bochra Boughzala, Montreal (CA); Mahmoud Mohamed Bahnasy, Lasalle (CA); Halima Elbiaze, Pierrefonds (CA); Brian Alleyne, Los Gatos, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 98 days.

(21) Appl. No.: 16/341,526

(22) PCT Filed: Dec. 23, 2016

(86) PCT No.: PCT/IB2016/057996
§ 371 (c)(1),
(2) Date: Apr. 12, 2019

(87) PCT Pub. No.: WO2018/069754
PCT Pub. Date: Apr. 19, 2018

(65) Prior Publication Data
US 2019/0379591 A1 Dec. 12, 2019

Related U.S. Application Data

(60) Provisional application No. 62/408,363, filed on Oct. 14, 2016.

(51) Int. Cl.
*H04L 12/26* (2006.01)

(52) U.S. Cl.
CPC ...... *H04L 43/0882* (2013.01); *H04L 43/0852* (2013.01); *H04L 43/0894* (2013.01); *H04L 43/106* (2013.01)

(58) Field of Classification Search
CPC ............ H04L 43/0882; H04L 43/0852; H04L 43/0894; H04L 43/106; H04L 45/00
See application file for complete search history.

(56) References Cited

U.S. PATENT DOCUMENTS

| | | | |
|---|---|---|---|
| 9,450,701 B2 * | 9/2016 | Do | H04L 1/0002 |
| 2002/0039371 A1 * | 4/2002 | Hedayat | H04L 43/0858 370/516 |
| 2005/0228896 A1 | 10/2005 | Nishida | |
| 2015/0063152 A1 * | 3/2015 | Chiang | H04L 41/14 370/252 |
| 2016/0105353 A1 * | 4/2016 | Cociglio | H04L 43/50 370/252 |

FOREIGN PATENT DOCUMENTS

| | | |
|---|---|---|
| WO | 03/010625 A2 | 2/2003 |
| WO | 2005/083953 A1 | 9/2005 |

* cited by examiner

*Primary Examiner* — Saumit Shah
(74) *Attorney, Agent, or Firm* — Ericsson Inc.

(57) ABSTRACT

Switch fabric in routers require tight characteristics in term of packet loss, fairness in bandwidth allocation and low latency for high-priority traffic. Such attributes have been resolved using specialized switch devices, but with the emergence of Data Center Bridging, the possibility of using commodity Ethernet switches to build switch fabric in routers is considered. Systems and methods are provided for estimating congestion associated with a network path in accordance with the variation in average delay experienced by samples of packets.

17 Claims, 15 Drawing Sheets

HETEROGENEOUS FLOW CONGESTION CONTROL

CROSS REFERENCE TO RELATED APPLICATIONS

This application claims the benefit of priority to previously filed U.S. Provisional Patent Application No. 62/408,363 entitled "HETEROGENEOUS FLOW CONGESTION CONTROL" filed on Oct. 14, 2016, the contents of which are incorporated herein by reference.

TECHNICAL FIELD

This disclosure relates generally to systems and methods for estimating congestion associated with a network path and modifying transmission rates to control the congestion.

BACKGROUND

Conventional router fabric designs use proprietary switch application-specific integrated circuit (ASIC) devices to provide their required characteristics. As these devices are typically designed for a closed environment, there has not been any standardization for such chip designs, and therefore they can be very expensive. These chips can also have some limited scalability. Building routers spanning more than a single chassis with these conventional ASICs has proven to be difficult and expensive.

Today's router fabric uses these specialized chips to provide characteristics such as guaranteed packet delivery across the fabric, low delay, consistent jitter, maximized bandwidth capacity, etc.

The rise of Data Center (DC) networks and Software-Defined Networking (SDN) require high quality, security, reliability and stability, especially as it concerns network convergence in case of congestion. Fiber Channel (FC) becomes the de facto storage protocol standard for implementing Storage Area Networks (SANs) in data centers. Yet the extension of storage protocol standard Small Computer System Interface (SCSI) over network (Internet Small Computer System Interface (iSCSI)) is in use. These technologies are very sensitive to frame loss. Several other applications have recently arisen that are very sensitive to network latency for example, high-frequency trading, high-performance computing, and RAM-Cloud.

When moving routers into the cloud/DC environment, one is faced with the challenge that the traditional monolithic, single chassis routers are not as suitable in a DC environment. Conventional router functions, such as the route processing and service cards can be mapped to a virtual network function (VNF) running in server blade(s). To retain the same capabilities as a monolithic router provided to those applications, the capabilities that the router fabric provided also need to be provided in the DC environment.

Due to the widespread use of Ethernet, it has become the primary network protocol that is considered to support both DC networking and SDN. Ethernet was originally designed as a best-effort communication protocol and it does not support frame delivery guarantee.

While it may be possible to bring specialized chips into a DC environment, the higher cost and their co-habitation with Ethernet pose potential problems. Using Ethernet can lower the cost and seamlessly integrate with the rest of the DC fabric. It would be desirable to provide the characteristics of a conventional router fabric using standard Ethernet technology.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided method for estimating congestion associated with a network path between a sending node and a receiving node. The method can be performed by the receiving node. The method includes receiving a first plurality of packets from the sending node and calculating a first average delay experienced by the packets in the first plurality. A delay variation is determined in accordance with the calculated first average delay, the delay variation indicating a trend in the average delay associated with the network path over time. A congestion metric associated with the network path is determined in accordance with the delay variation and transmitted to the sending node.

In another aspect of the present invention, there is provided a network node comprising circuitry including a processor and a memory. The memory contains instructions executable by the processor whereby the network node is operative to estimate congestion associated with a network path. The network node receives a first plurality of packets from a sending node. The network node is operative to calculate a first average delay experienced by the packets in the first plurality. A delay variation is determined in accordance with the calculated first average delay, the delay variation indicating a trend in the average delay associated with a network path over time. A congestion metric associated with the network path is determined in accordance with the delay variation and transmitted to the sending node.

In another aspect of the present invention, there is provided a network node comprising a packet receiving module, a congestion estimation module and a rate controlling module. The packet receiving module is configured for receiving a first plurality of packets from the sending node. The congestion estimation module is configured for calculating a first average delay experienced by the packets in the first plurality, and for determining a delay variation in accordance with the calculated first average delay, wherein the delay variation indicates a trend in the average delay associated with the network path over time. The rate controlling module is configured for determining a congestion metric associated with the network path in accordance with the delay variation, and for transmitting the congestion metric to the sending node.

In some embodiments, the delay variation can indicate a trend in the average delay relative to at least one previously calculated average delay. The delay variation can be determined further in accordance with a second average delay associated with a second plurality of packets previously received from the sending node. The delay variation can be calculated in accordance with a difference between the first average delay and the second average delay. The delay variation can be determined further in accordance with a duration of time between reception of the first plurality of packets and reception of the second plurality of packets. The delay variation can be calculated in accordance with a difference between the first average delay and the second average delay divided by a duration of time between reception of the first plurality of packets and reception of the second plurality of packets.

In some embodiments, each packet in the plurality can include an indication of a sending time of the packet. In some embodiments, the reception time for each packet in the plurality can be recorded. Further, a delay experienced by each packet in the plurality can be calculated in accordance with a sending time and a reception time for the packet.

In some embodiments, the congestion metric can indicate that the transmission rate of the sending node should be modified. The congestion metric can be sent to the sending node to control a transmission rate of the sending node. In some embodiments, the congestion metric is transmitted to the sending node responsive to determining that the congestion metric is greater than zero.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
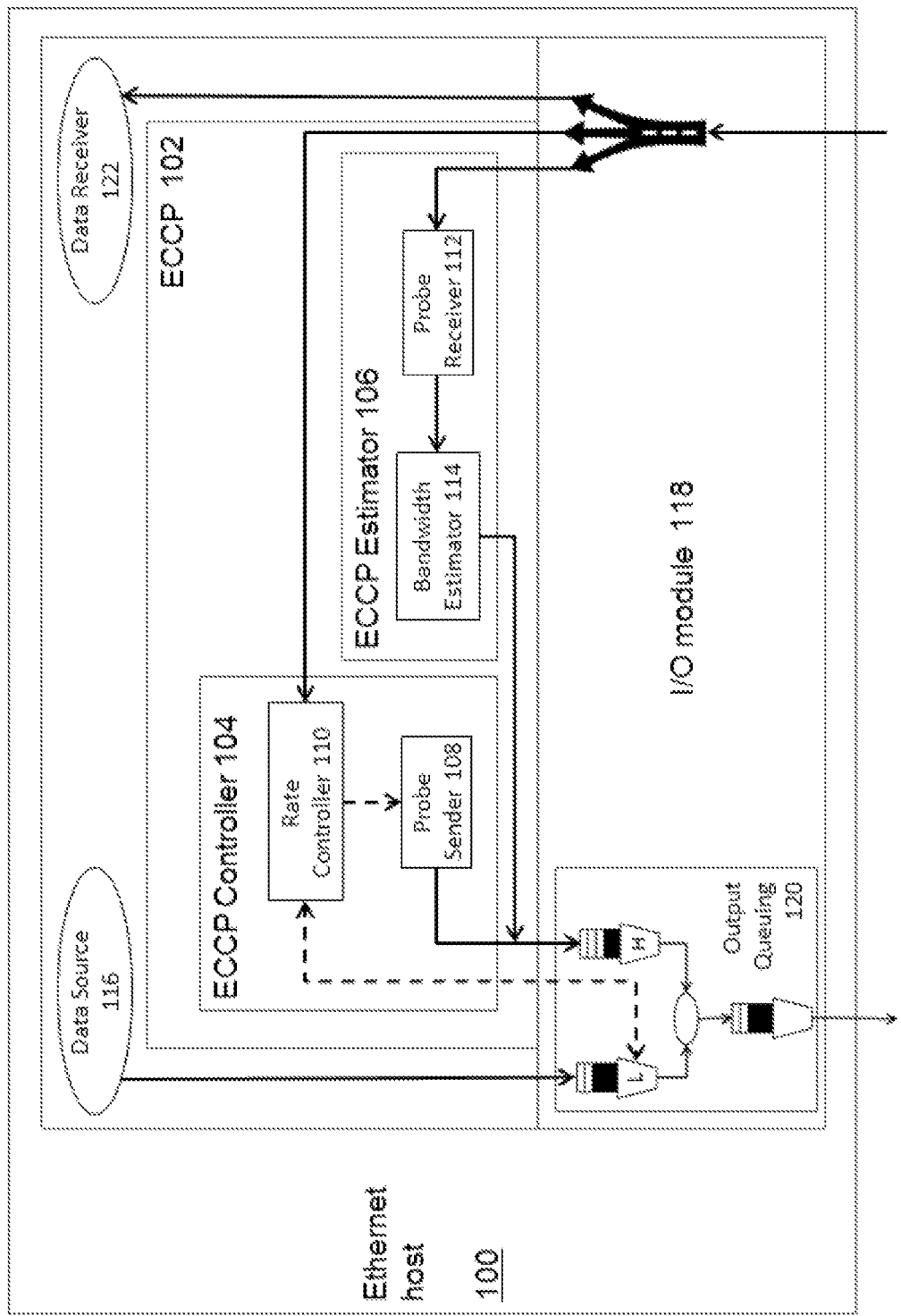
FIG. 1 illustrates an example ECCP Ethernet host.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Prior implementations of Data Center (DC) fabric using Ethernet as the key technology have resulted in a number of issues. Ethernet PAUSE (IEEE 802.3x) was issued to solve the congestion problem by sending a PAUSE request to the sender when the receiver buffer reaches a specified threshold. The sender stops sending any new frames until the receiver sends notification that it has enough buffer space. Some data flows are very sensitive to frame loss such as Fibre Chanel over Ethernet (FCoE) and Internet Small Computer System Interface (iSCSI), others depend on higher layer traffic control. Therefore, operating on the entire link is a disadvantage of Ethernet PAUSE.

Priority-based Flow Control (PFC) (IEEE 802.1Qbb) was introduced to address this issue by enabling the operator to discriminate flows and select which flow is to be controlled. PFC divides the flow into eight classes (IEEE 802.1p) and discriminates the traffic based on these classes. PFC reduces flow indiscrimination but it is still limited when it comes to Head of Line Blocking (HOL) blocking. To ensure the maximum performance of PFC, all devices have to support it and strict buffer and timing requirements must be applied.

Quantized Congestion Notification (QCN) is part of the IEEE Data Center Bridging (DCB) standard proposal aimed at enhancing existing IEEE 802.1 bridge specifications to satisfy the requirements for I/O consolidation. The goal of QCN is provide end-to-end congestion notification for Layer 2 networks. For QCN to be effective, it must be enabled on the entire data path of the network. When a large number of nodes or flows are connected in a QCN network, the QCN congestion control algorithm causes higher buffer usage and packet lost. QCN is also "unfair", as the switch selects—at random—a received packet, and the source of that random packet will be rate controlled. As such, QCN cannot be considered scalable. QCN also uses the switch buffer length as a method to measure the current network load. Unfortunately, using this method implies that congestion has already occurred.

Other methods to measure a current network load along a path have been proposed. U.S. Pat. No. 8,503,320, the contents of which are incorporated herein, describes systems and methods for determining end-to-end available bandwidth of a path in a packet-switched communication network. In practice, such mechanisms have limited capability to provide an accurate bandwidth estimate when very little bandwidth is available (i.e. when the network is getting close to full capacity). Furthermore, these mechanisms were developed assuming that a single probing host would be used. In the situation where a large number of network paths are probed at the same time, it is evident that these mechanisms do not scale with the number of hosts. The resulting bandwidth estimates can be grossly underestimated.

Embodiments of the present disclosure are directed toward addressing limitations of the conventional congestion measurement and mitigation techniques. Some embodiments include continuously sending probe traffic along network paths to obtain bandwidth estimations. Using these estimates, it can be determined if the network is close to congestion and should start applying rate control (e.g. limit the transmission rate).

Other embodiments of the present disclosure include sending probe traffic along network paths to obtain link utilization estimates. Further embodiments include recording the sending time and the receiving time associated with data packets to obtain link utilization estimations. The sending rate can be adjusted in accordance with the estimated link utilization.

The Ethernet Congestion Control and Prevention (ECCP) system described herein comprises adding a controlled loop system on Ethernet. ECCP continuously probes the status of the Ethernet network to estimate the available bandwidth available on a network path between two end-points. This estimate is then used in the controlled part of ECCP to regulate the amount of traffic allowed to be transmitted toward the other end-host. As the amount of available bandwidth gets close to zero, the outgoing traffic is further constrained in order to prevent congestion and dropped packets in the network.

Some embodiments of the present disclosure do not require any modification from Ethernet bridges, only the end-hosts.

Some embodiments of the present disclosure will be described as only involving the source and destination end-nodes. It will be appreciated by those skilled in the art that the switches and/or intermediate nodes between the end-hosts can also be involved in the probing and/or bandwidth estimation mechanisms. For example, a switch can add congestion or link utilization information along a network path.

To guarantee scalability and alleviate congestion, an upper limit can be defined (e.g. an operating point below 100% utilization) at which it is desired for the system to stabilize. By defining such threshold, the system can maintain the link usage below this threshold and start regulating the sending rates whenever this threshold is reached. The ECCP system does not try to estimate how much bandwidth is available before reaching 100% availability (link capacity). Instead, ECCP estimates how much bandwidth is available within a window that is sized equal to a given percentage of the current sending rate.

Embodiments of the present disclosure are directed to preventing congestion in Ethernet network while achieving maximum throughput and minimum latency by keeping the queues of Ethernet switches empty. In order to keep the switches queue length close to zero, some embodiments include controlling a host's transmission rate rather than controlling the queue length.

In order to prevent frame queueing, ECCP is configured to maintain this minimal available bandwidth margin just before the congestion point. As an example, the system can be configured to guarantee that at least (5%) of the link capacity is always available. This margin, which will be referred to as the Availability Threshold (AvT) can be used as a "safety margin". While this may not improve the overall link utilization, it can improve the network latency as a switch's queues will be almost empty, which can reduce the network latency to the minimum value. In addition, the network will not experience head-of-line (HOL) blocking.

The various ECCP mechanisms described herein use an end-to-end available bandwidth estimation and/or link utilization estimation technique. This information can be used to adjust the host transmission rate accordingly. This process can be distributed on hosts and does not require Ethernet switch modification.

FIG. 1 is a block diagram illustrating an Ethernet host 100, as implemented in a single node. Each end-host connected to an Ethernet switched network can implement the ECCP mechanism 102. ECCP 102 consists of two major components: an ECCP Controller 104 and an ECCP Estimator 106. The ECCP Controller 104 is configured to periodically send a series (e.g. a train) of probe messages towards each remote destination where data traffic is being transmitted. The ECCP Controller 104 comprises a probe sender module 108 and a rate controller module 110. The ECCP Estimator 106 collects the probe information, calculates an estimation of the available bandwidth based on those probes, and returns the bandwidth estimate to the ECCP Controller 104. The ECCP Estimator 106 comprises a probe receiver module 112 and a bandwidth estimator module 114. The ECCP Controller 104 can then determine if it needs to adjust (e.g. limit) the rate of transmission of the data source 116. If enough bandwidth is available, the data transmission rate can be increased. If the bandwidth estimate is below an acceptable threshold, the data transmission rate will be reduced. The adjustment can be made proportional to the severity of the situation. For example, if the available bandwidth is close to zero, the rate will be reduced more than if the available bandwidth is close to the minimal limit.

The input/output module 118 includes an output queueing module 120 for combining the data traffic to be transmitted, from data source 116, and the probe traffic from ECCP Controller 104. Output block 120 can further include one or more rate limiters for controlling the sending rate of the data and/or probe traffic. Similarly, on the input side, the received traffic can be divided into data traffic destined for the data receiver 122, probe traffic for the probe receiver 112, and/or rate control information for the ECCP Controller 104. It will be appreciated that in the embodiment of FIG. 1, the ECCP components and sub-component are shown as implemented in a single node 100.

Figure 2:
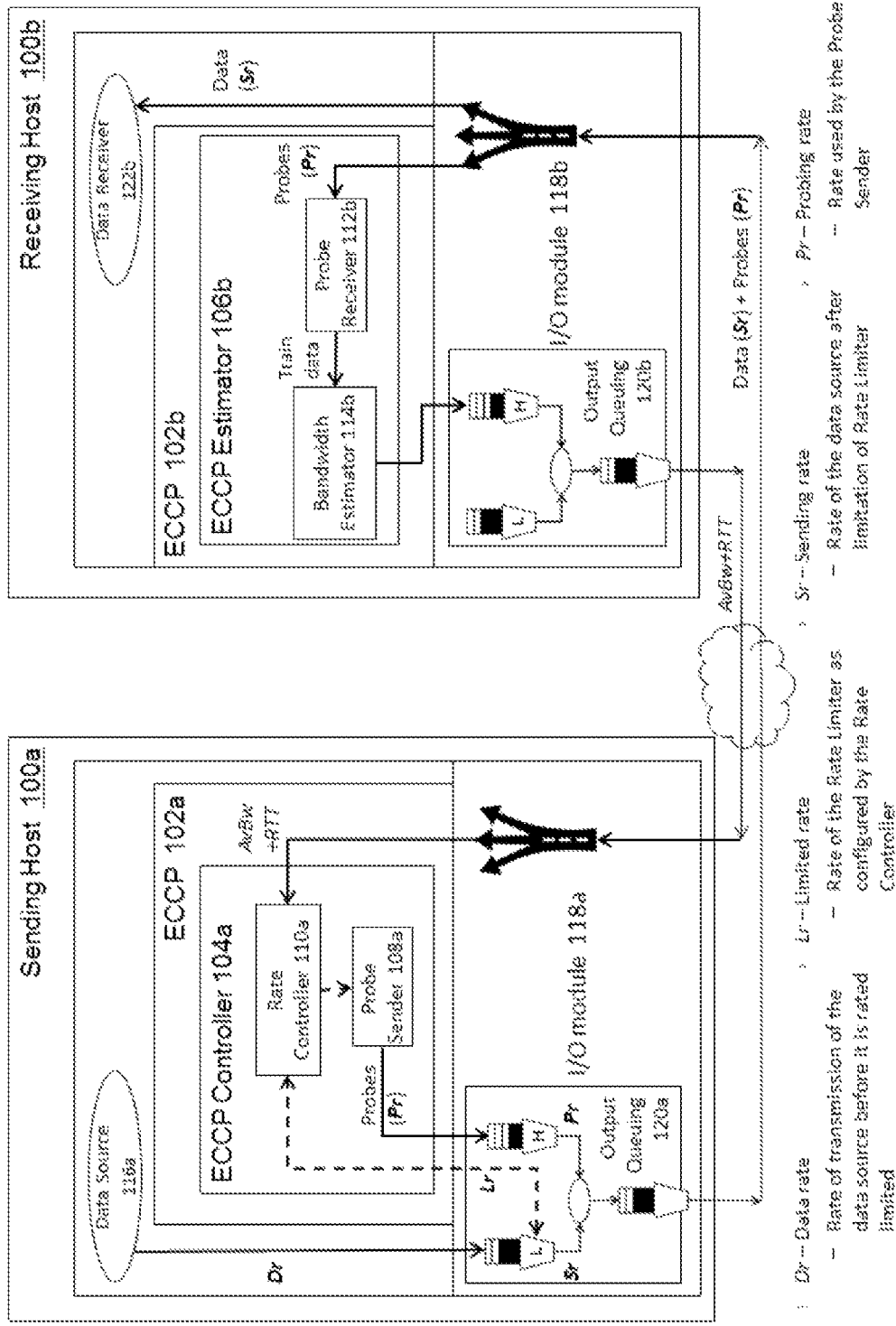
FIG. 2 illustrates an example ECCP Ethernet host pair.

FIG. 2 is a block diagram illustrating an ECCP Ethernet host pair 100a and 100b. The embodiment of FIG. 2 includes the same components as FIG. 1, as they would be implemented by two different nodes, Sending Host 100a and Receiving Host 100b, interacting in a network. The ECCP Controller 104a is used by the sending host 100a to generate probes and adjust the transmitting rate. The ECCP Estimator 106b is used by the receiving host 100b to collect the probes (e.g. as a train) and perform an estimation of the bandwidth available between the two hosts 100a and 100b.

In FIG. 2, Dr indicates the "Data rate" which is the rate of transmission of the data source 116a prior to having any rate limiting applied to it. Lr represents the "Limited rate" which is the rate of the rate limiter in block 120a as configured by the Rate Controller 110a. Sr represents the "Sending rate" which is the rate of the transmission of the data source 116a after limitation of the Rate Controller 110a has been applied. Pr represents the "Probing rate" which is the rate of transmission used by the probe sender 108a.

It will be appreciated that FIG. 2 shows only the ECCP Controller 104a portion of the sending host 100a and the ECCP Estimator 106b portion of the receiving host 100b for illustrative purposes of the interaction between the sub-components of the ECCP system. The sending host 100a ECCP estimator and the receiving host 100b ECCP controller are not shown as they are not active in this embodiment.

FIG. 2 illustrates an exemplary scenario where the (left) sending host 100a starts sending data to the (right) receiving host 100b. In this scenario, the sending host 100a ECCP probe sender module 108a starts by sending time stamped probe frames within data toward the output port 120a. The probe rate Pr can be randomized within a maximum limit equal to AvT×Sr. The rate limiter limits the data transmission rate to Lr. The input/output module 120a merges the data and probe frames and sends them out through the network.

Once the receiving host 100b receives the frames, I/O module 118b can differentiate them into three types: data, probe, or estimation. The receiving host 100b sends probe frames into probe receiver module 112b. The probe receiver module 112b can read the time stamp for each frame and add the reception timestamp; this information is then forwarded to the bandwidth estimator module 114b. The bandwidth estimator 114b calculates the Available Bandwidth (AvBw). After that, it sends the AvBw estimation encapsulated in an estimation frame towards the sending host 100a. Once the sending host 100a receives the estimation frame, it can update the rate controller module 110a. According to the available bandwidth estimation AvBw, the rate controller module 110a can determine the maximum limit of the host sending rate (e.g. the Limited Rate Lr). It can then update the rate limiter in the input/output block 118a with the new Lr to control the data transmission rate.

In some embodiments, the ECCP probe sender 108a uses a modified model of the network path (end-to-end) as concatenated hops to estimate the available bandwidth. Each hop consists of an input queue and a transmission link. In the network, each queue has First-Come First-Served (FCFS) service policy (i.e. First-In First-Out (FIFO) queues). Each link j has a constant capacity $C_j$ and a time-varying cross traffic X. Considering a single congestion link with maximum capacity C and cross traffic X, the available link bandwidth is B=(C−X).

Based on this model, ECCP sending host 100a can send sequences of N probe frame pairs with the same inter-frame interval and a probe rate of Pr. The rate Pr can be randomized for each new sequence. The accuracy of the estimate can improve as N is increased. As discussed, in some embodiments ECCP is not used to measure the exact available bandwidth but, in contrast, to estimate how much bandwidth is available within a window (AvT×Sr) above the current sending rate (Sr). In order to perform this verification, the maximum randomized probe rate is limited to (AvT×Sr). The minimum value for the probing rate can be adjusted as required. The ECCP probe sender 108a time-stamps the probe frames while sending.

The ECCP Estimator 106b can include two modules, the probe receiver 112b and the bandwidth estimator 114b. The probe receiver 112b reads the time stamp for each frame and adds a receiving time stamp, then sends this information to the bandwidth estimator module 114b.

In prior bandwidth estimation techniques, such as U.S. Pat. No. 8,503,320, a train of timestamp probes of different rates is sent over the network toward a destination. The receiver timestamps those probes and, based on the difference between delays of consecutive probes at different rates, it can estimate the amount of available bandwidth along the path between the probe sender and the probe receiver. This estimation technique can determine how much bandwidth is available between two hosts. To do this estimation, it is required to send probes in the range of zero to maximum link capacity. However, in a network where there are multiple hosts connected to each other, and each host will send probes, probes cannot be sent at the maximum link capacity as it would certainly create congestion and would not scale with the number of hosts.

In embodiments of the present disclosure, such as FIG. 2, a similar probing technique can be employed. However, the estimation attempts to answer a different question than the prior art techniques—what is the amount of bandwidth available within a margin above the current sending rate? The purpose is not to attempt to reach the maximum (e.g. 100%) link utilization by the sources, as that would create congestion. An objective is to guarantee link utilization close to 100% by working within a certain margin close to 100% link utilization. Embodiments of ECCP are configured to maintain a predetermined minimal amount of available bandwidth just before the congestion point. As an example, a performance goal can be set to stay within 5% of the link capacity of a link. If the total link capacity is 10 Gbps, ECCP can be configured to guarantee that at least 500 Mbps (5%) of the link capacity is always available.

This margin is the Availability Threshold (AvT), as discussed, and it can be defined as a percentage independent of the link capacity. This margin can also have a second purpose. This "freed" bandwidth will be used for sending the probe messages. This margin can also be used to determine the limit of the Probe Rate (Pr).

As the maximum value of the probe rate is AvT×Sr, the bandwidth estimator 114b will return a value between 0 and AvT×Sr. If there is AvT×Sr bandwidth available, then it is determined that there at least a certain (threshold) amount of bandwidth available. If there is less than AvT×Sr bandwidth available, then the ECCP mechanism can adjust the rate of the sender to reduce the risk of congestion.

The Rate Controller 110a is another component of ECCP mechanism. Its role includes determining the value of the Limited Rate (Lr) which indicates the maximum output rate for that particular line card. The Rate Controller 110a can use the estimate of the available bandwidth as reported by the Bandwidth Estimator 114b and the sending rate (Sr) to determine if the limit of the Rate Limiter in block 120a should be adjusted. It is configured to determine if a rate limit should be applied to the data source 116a and to set the Rate Limiter in 120a accordingly.

The Limited Rate (Lr) is calculated based on AvBw estimate in a way that guarantees for every packet leaving the ingress line card to make it through the fabric and to reach the egress line card, to provide fairness amongst all the line cards in the network.

The rate controller 110a reads the AvBw estimate that is sent through the network from the bandwidth estimator 114b of the receiving host 100b. The Round Trip Time (RTT) can also be considered. RTT is defined as the time for a packet to be forwarded to a destination and returned back to the source. A set of parameters are defined for the rate control algorithm to determine whether the current value of the limited rate (Lr) should be increased or decreased. Thus, the rate controller 110a calculates these control parameters first, and then it can adjust the new value of the Lr.

Figure 3A:
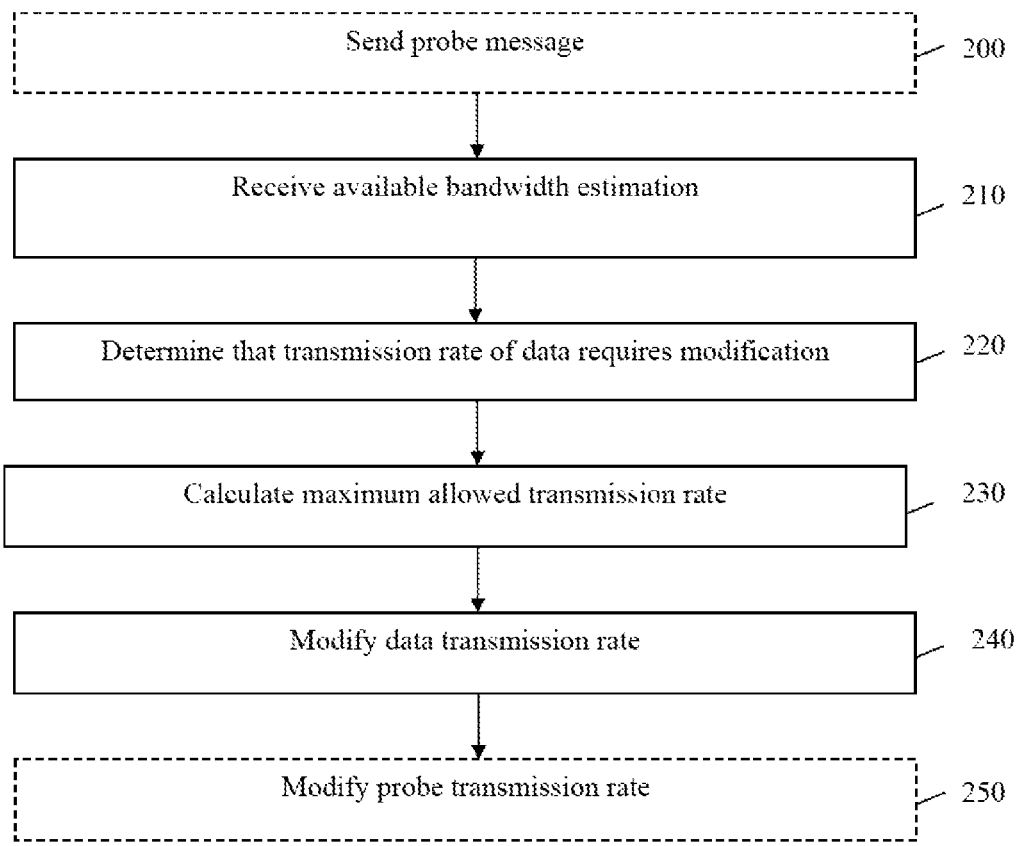
FIG. 3a is a flow chart illustrating a method for adjusting a data transmission rate.

FIG. 3a is a flow chart illustrating a method for adjusting a data transmission rate to prevent network congestion. The method of FIG. 3a can be implemented by an ECCP Controller 104a at a sending node 100a in a communication network. The method begins by optionally sending a probe message to a destination node in the network (block 200). The probe message can be one of a plurality of time-stamped messages sent at a variable rate (e.g. the probe transmission rate).

An available bandwidth estimation is received (block 210). The available bandwidth estimation can indicate an amount of bandwidth that is available along the path between the source node and the destination. It is determined if a modification to the data transmission rate of the sending node 100a is required in accordance with the received available bandwidth estimation (block 220). This determination can be made by comparing the available bandwidth estimation to an availability threshold, which defines a margin of the minimal bandwidth required to be available before reaching the link capacity (e.g. 100% link utilization). The determination can be that the data transmission rate needs to be increased or decreased. The determination can include selecting between initiating a rate increase process or a rate decrease process.

The maximum allowed transmission rate can be calculated based on the received available bandwidth estimation and respecting the availability threshold (block 230). The data transmission rate can then be modified in accordance with the calculated maximum allowed transmission rate (block 240). Optionally, the probe transmission rate can also be modified in accordance with the calculated maximum allowed transmission rate (block 250).

The various systems and methods described herein can be used to adjust the data transmission rate of a node in accordance with the maximum allowed transmission rate.

In some embodiments, different data transmission rate adjustments can be made to different flows (e.g. traffic classes) between the same two end hosts. For example, a first limited rate can be applied to a first type of traffic flow and a second limited rate can be applied to a second type of traffic flow by a sending node. This determination can be made based on classifying, or categorizing, packet traffic in accordance with at least one parameter.

Figure 3B:
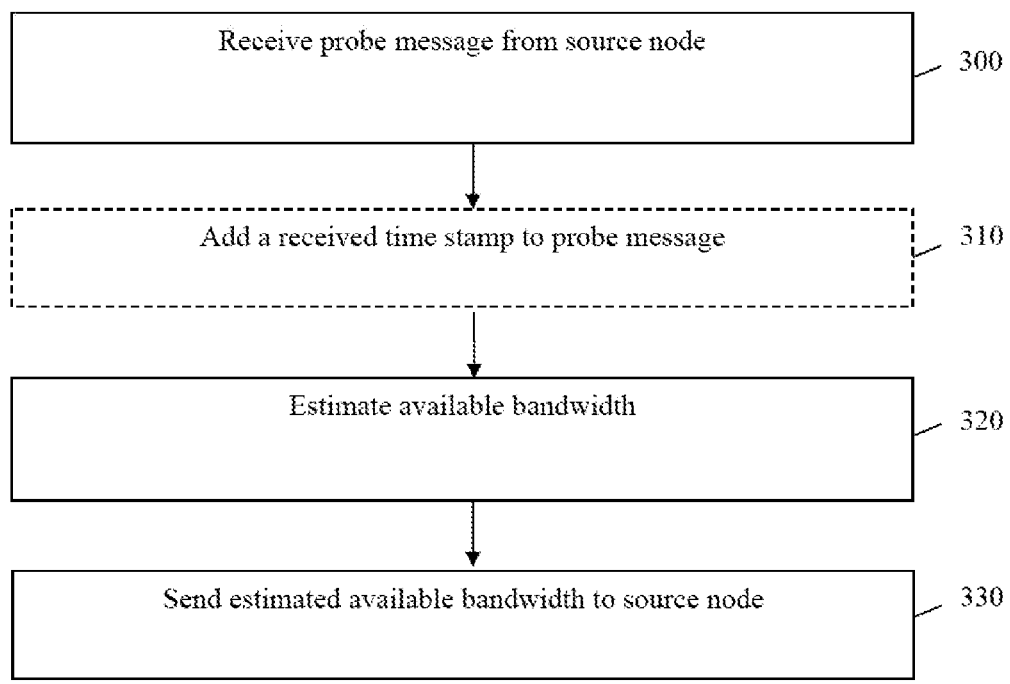
FIG. 3b is a flow chart illustrating a method for estimating available bandwidth.

FIG. 3b is a flow chart illustrating a method for estimating available bandwidth between a source node 100a and a destination node 100b. The method of FIG. 3b can be implemented by an ECCP Estimator 106b at a receiving node 100b in a communication network.

The method begins by receiving a probe message from the source node (block 300). This can include receiving a packet or frame and identifying that it is a probe message. In some embodiments, received messages can be classified as one of data messages, probe messages, or estimation messages.

A sending time-stamp of the probe message can be read and a receiving time-stamp can be added to the probe message (block 310). The available bandwidth between the sending and receiving nodes can be estimated using the time stamp information (block 320). The calculated available bandwidth estimation can then be sent to the source node (block 330).

In the embodiments described above, ECCP can employ a distributed algorithm that runs only on end-hosts 100 without requiring participation of the switch. Each ECCP agent relies on a bandwidth estimator 114 and a rate controller 110. The algorithm has a control cycle that starts with a probe sender 108 that is part of the controller module 104.

The probe traffic can be generated with a rate that is controlled and limited by the amount of the sending rate. The probe packets can carry information such as timestamps, packet identifier and train identifier, and this information can be used by the estimator in order to compute the estimation of the available bandwidth. Gathering this information at the receiving side is the role of the probe receiver. The probe receiver also adds the receiving time for each probe packet before passing the collected probe train to the bandwidth estimator. The estimator uses a computation algorithm similar to bandwidth available on real time methodologies, but instead of trying to have the most accurate available bandwidth estimate, the estimator calculates a feedback value to return to the sender to indicate if there is room to increase its sending rate, using the Additive Increase Multiplicative Decrease (AIMD) principle for example. If the feedback is negative, this means that the system is close to congestion. In that case, the ECCP rate controller can trigger a rate decrease process such as a process similar to the QCN reaction point algorithm.

The ECCP mechanisms described thus far allows for a proactive control on the output rate and does not wait for congestion to occur to react. ECCP helps ensure fairness between all the nodes since they continue probing for the available bandwidth individually while adapting to changes in network conditions. ECCP is also scalable as the probe amount is independent of the number of hosts and flows and it consumes a controlled amount of the overall bandwidth.

Some embodiments of ECCP are based on a self-induced congestion probing model that allows the probes to be generated in a rate higher than the available bandwidth. When the system approaches network congestion, queue length fluctuation can be observed. Such behavior can impact the packet latency and jitter. In order to limit the chance of reaching congestion, ECCP can keep the link utilization below the maximum link capacity by a certain percentage. However, in some cases this safety margin can be considered to be a waste of network bandwidth. The probes generated by the ECCP controller also consume an amount of the bandwidth from the actual network traffic workload. Probe generation can also require processing power that can introduce an overhead in terms of CPU usage.

Figure 4:
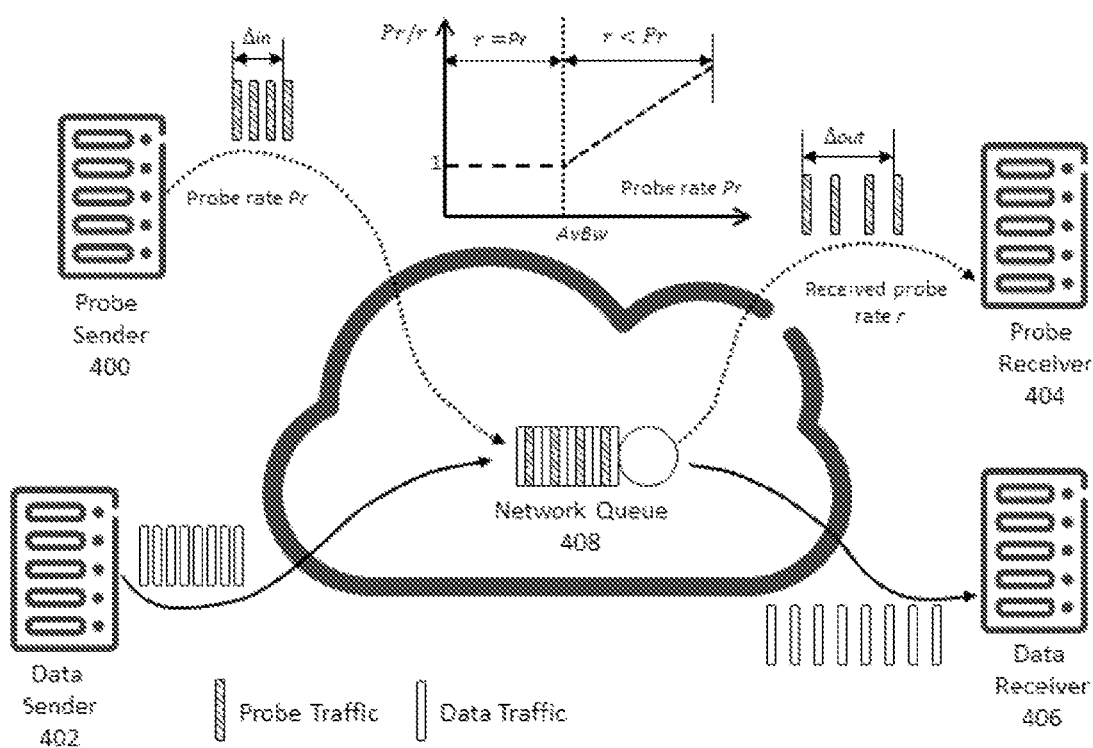
FIG. 4 illustrates an active probing scheme based on self-induced congestion.

As discussed, some embodiments of ECCP use an available bandwidth estimation technique which is based on self-induced congestion. FIG. 4 illustrates an active probing scheme based on self-induced congestion. Probe Sender 400 adds probe traffic to the data sent by Data Sender 402. The probes are received by Probe Receiver 404 and the data by Data Receiver 406. The concept of self-induced congestion relies on that, if the injected probe rate Pr (as sent by Probe Sender 400) is less than or equal to AvBw, the arrival probe rate r (as received by Probe Receiver 404) matches the probe rate Pr of the sender 400. However, if Pr exceeds AvBw, the probe packets are queued in the network queue 408 and the output probe delay is increased, consequently reducing r (Pr/r>1). Thus, this technique requires sending probes at a rate higher than the available bandwidth in order to estimate AvBw, which might put the path into congestion.

On the other hand, ECCP controls the sending rate using a self-increase process, and a rate decrease process based on negative feedback. Therefore, in some embodiments ECCP does not require an exact estimation of AvBw, it may only require feedback when the link is close to congestion in order to trigger the rate decrease process. Thus, an indication of the increase (or trend) in link utilization may be sufficient for ECCP.

Once the ECCP controller receives AvBw information, it can calculate a feedback value $F_b$ to control the sending rate R according to Additive Increase Multiplicative Decrease principles.

$$R \leftarrow \begin{cases} R(1 - G_d \times |F_b|) & \text{if } F_b < 0 \\ \frac{1}{2}(R + TR) & \text{otherwise} \end{cases} \quad (1)$$

where $G_d$ is a fixed value and is taken in a way that $G_d|F_{max}|=\frac{1}{2}$ and TR is the target rate which is equal to the last sending rate before congestion.

Further variants of ECCP will be considered to address the potential limitations mentioned herein. In some embodiments, a technique called "link utilization estimation" can be used in place of the available bandwidth estimation. Two alternative embodiments, referred to as Short Probe ECCP (SP-ECCP) and No Probe ECCP (NP-ECCP) will be discussed and compared.

In some embodiments, a technique for estimating link utilization using low rate probe traffic (e.g. short probe) can be employed. The end-to-end network path can be modeled as concatenated hops, where each hop consists of an input queue and a transmission link. The utilization of the queue in a single-hop scenario is $U=1-\pi$, where $\pi$ is the probability that the queue is empty.

By sending a low rate probe Pr, the link utilization can be expressed as U(r)=min (1, U(0)+Pr/C), where C is the capacity of the link and U(0) is the link utilization when the probe rate Pr=0. For the multi-hop case, this equation can be approximated as the following first order equation:

$$U(r) \approx \min(1, aPr + b) \quad (2)$$

where a and b are constants. Equation 2 shows that the relation between the link utilization and the probe rate is linear.

Figure 5:
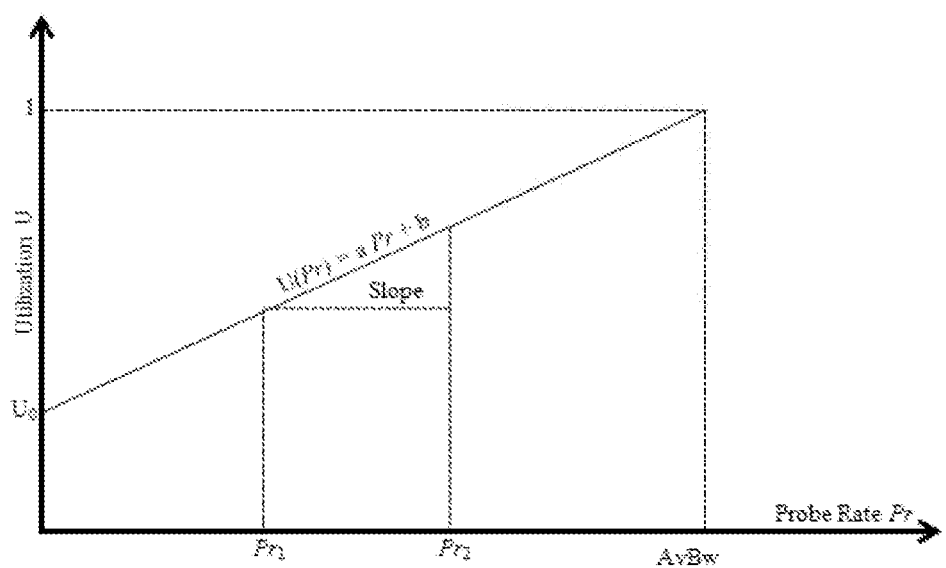
FIG. 5 is a graph illustrating the relationship between link utilization and probe rate.

FIG. 5 is a graph 500 illustrating the relationship between the link utilization U and the probe rate Pr. As shown in graph 500, the relationship is linear and can be represented by the equation U=U(0)+Pr/C, as above, where U(0) is the link utilization when the probe rate Pr=0. By calculating a and b using at least two probe rates, AvBw can be estimated as the probe rate at the point where the link utilization is 1 (e.g. 100%).

$$AvBw = (1 - b)/a \quad (3)$$

The key to solving equations 2 and 3 is to estimate link utilization. A packet train can be sent to compute the fraction of packets that have experienced queuing delay along the path. By time-stamping the probe packets at the sender and the receiver, one can compute the minimum one-way delay of any set of packets $\{p_1, p_2, \ldots, p_N\}$. This minimum delay corresponds to the packet(s) that have not experienced any queuing delay. Thus, the packets that experienced delay greater than the minimum delay are the fraction of packets that suffered queuing delay. Hence the estimated link utilization can be calculated as:

$$U = \frac{\|d_i > \min(D) \mid d_i \in D\|}{\|D\|} \quad (4)$$

where $D = \{d_1, d_2 \ldots d_N\}$ is the set of one-way delays experienced by packets $\{p_1, p_2, \ldots, p_N\}$.

The estimated link utilization can be further used to calculate the feedback value $F_b$ which reflects a closer state to congestion, and thus, this feedback value can be used to control the sending rate.

Figure 6:
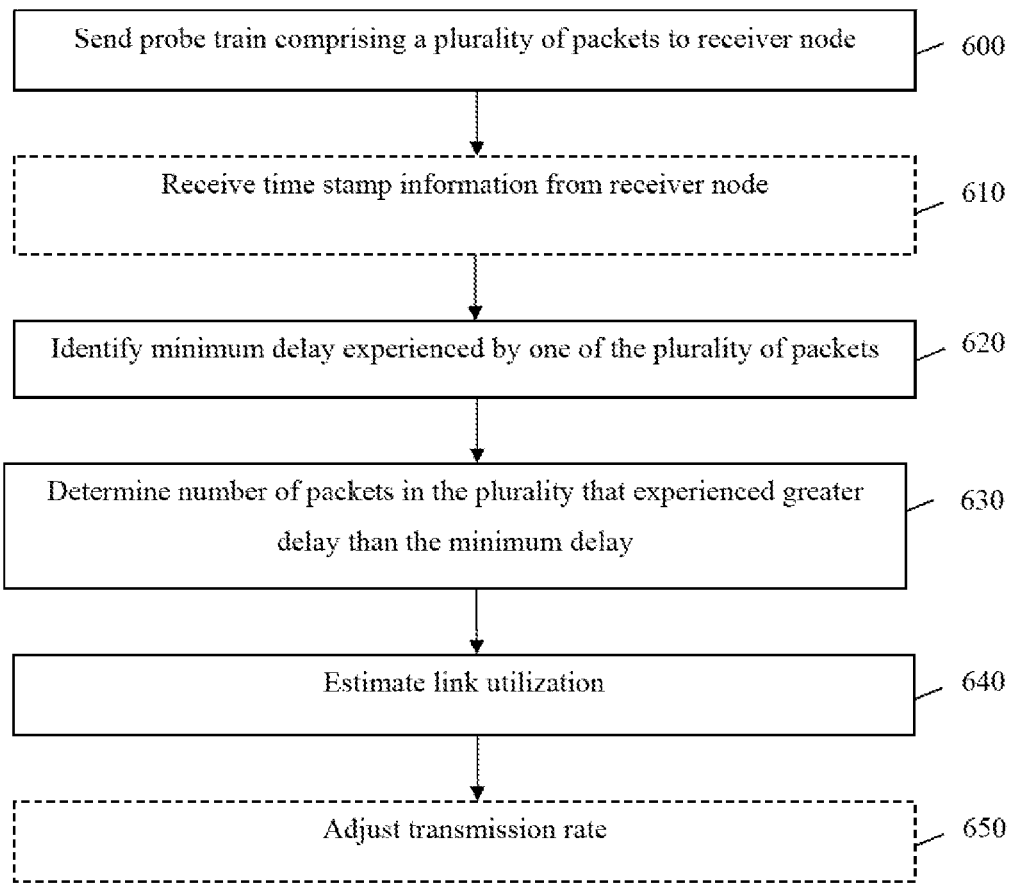
FIG. 6 is a flow chart illustrating a method for adjusting a data transmission rate using a short probe train.

FIG. 6 is a flow chart illustrating a method for adjusting a data transmission rate using a short probe train. The method of FIG. 6 can be implemented by an ECCP Controller such as 104a at a sending node 100a in a communication network. The method begins by sending a probe train to a receiver/destination node in the network (block 600). The probe train can comprise a plurality of time-stamped packets/messages. The packets in the probe train can be time-stamped at receipt by the receiver/destination node. Optionally, the sending node can receive this time stamp information from the receiver node (block 610).

The sending time stamp and the receiving time stamp information can be compared to determine the delay experienced by each packet in the probe train. This comparison can be used to identify the minimum delay experienced by any one or more of the packets in the probe train (block 620). A packet that has experienced only the minimum amount of delay can be considered to have experienced no queueing delay. The step of identifying the minimum delay can optionally be performed by either of the sending node or the receiving node. If performed by the receiving node, the result can be transmitted to the sending node.

The number of packets in the probe train that experienced greater than the minimum delay can then be counted and determined (block 630). A fraction, or percentage, of the packets in the probe train that experienced greater than the minimum delay can also be determined. A packet that has experienced greater than the minimum amount of delay can be considered to have experienced queueing delay. The link utilization (e.g. between the sending node and the receiving node) can be estimated based at least partially on the number of packets in the probe train that have experienced greater than the minimum delay (block 640). The step of estimating link utilization can optionally be performed by either of the sending node or the receiving node. If performed by the receiving node, the result can be transmitted to the sending node. The estimated link utilization can be forwarded to a rate controller mechanism at the sending node to adjust the transmission rate (of the data and/or of the probe train) in accordance with the link utilization estimate (block 650).

It will be appreciated by those skilled in the art that a similar method for adjusting a data transmission rate using a short probe train can be performed by an ECCP Estimator at a receiving node in a communication network. Many of the steps of the method of FIG. 6 can be performed at either the sending node or the receiving node without altering the overall methodology.

Unlike the conventional bandwidth available on real time mechanisms, the link utilization estimation technique discussed above does not require a fixed inter-frame interval. By eliminating this restriction, it is possible to use the data frames themselves as probes. This will be referred to as the NP-ECCP approach. However, the data frames need to be time stamped, which may not be practical to implement at the Ethernet layer (e.g. there may not be an appropriate field in which to add time-stamp information). In order to overcome this issue, the data sender can keep track of the sending time and the Frame Check Sequence (FCS) of the last H packets transmitted. NP-ECCP can use FCS as a frame identifier and H can be taken to be greater than the number of packets that can be sent while waiting for data information acknowledge (H>(C*T/L)), where L is the packet size and T is the time between two acknowledges ($H > 10*10^9 *0.5*10^{-3}/(1000*8)=625$). Alternatively, the pair of FCS and the frame length can be used as the frame identifier as the possibility of having a repeated FCS and frame length within H frames is rare.

The receiver samples the received data based on a byte counter $BC_r$. Note that the sampling is based on a byte counter instead of a timer, which achieves fairness by generating more feedback messages for the high rate flows. Once this counter expires, the receiver sends the receiving time, the FCS and frame length of the last N frames encapsulated in an Ethernet frame to the sender (N is taken to be equal 32 in this example). When the data sender receives this information, it searches in its local information for the sending time of each frame based on the FCS and frame length pair.

Then, the sender can use the link utilization estimate technique to calculate an estimation of the congestion (CE) as the percentage of packets that exceed the minimum delay by simplifying Equation 4.

$$\overline{CE} = \frac{\text{Count}((d_i - \min(D)) > 0) \mid d_i \in D}{\text{Count}(D)} \quad (5)$$

In order to reduce the effect of measurement error and system noise, a certain delay threshold ($D_{th}$) will be considered before counting delayed packets (Equation 6).

$$\overline{CE} = \frac{\text{Count}((d_i - \min(D)) > D_{th}) \mid d_i \in D}{\text{Count}(D)} \quad (6)$$

NP-ECCP can be implemented using a similar architecture to ECCP (as shown in FIGS. 1 and 2). In NP-ECCP data is used as the probe, but data frame lengths are not fixed like probe frames. Hence, the frame delay can be normalized to its length and then multiplied by the average frame size (which is can be 1000 Bytes, for example). Thus Equation 6 becomes:

$$\overline{CE} = \frac{\text{Count}((\hat{d}_i - \min(\hat{D})) > D_{th}) \mid d_i \in \hat{D}}{\text{Count}(\hat{D})} \quad (7)$$

where $\hat{D} = \{\hat{d}_1 \hat{d}_2 \ldots \hat{d}_N\}$ is the set of normalized one-way delay; $\hat{d}_i = d_i/l_i \times 1000$; and $l_i$ is the length of the $i^{th}$ frame.

Next, the NP-ECCP system can calculate a feedback value $F_b$ to indicate how close the link utilization is to 1 (e.g. how close to 100% capacity) in Equation 8:

$$F_b = -K^*(\overline{CE} + w^*(\overline{CE} - \overline{CE}_{old})) \quad (8)$$

where $CE_{old}$ is the CE of the last calculated $F_b$, and K is constant and is taken to be equal 32 to keep the $F_b$ values of NP-ECCP within the same range as the initial ECCP.

Finally, it passes this calculated feedback value to the controller in order to execute either a rate increase or rate decrease process (as per Equation 1). For example, if the NP-ECCP rate controller receives a negative $F_b$, it can control the sending rate accordingly. It is noted that the NP-ECCP system does not use probe generation, which can reduce the required computational power and increase the throughput.

Figure 7:
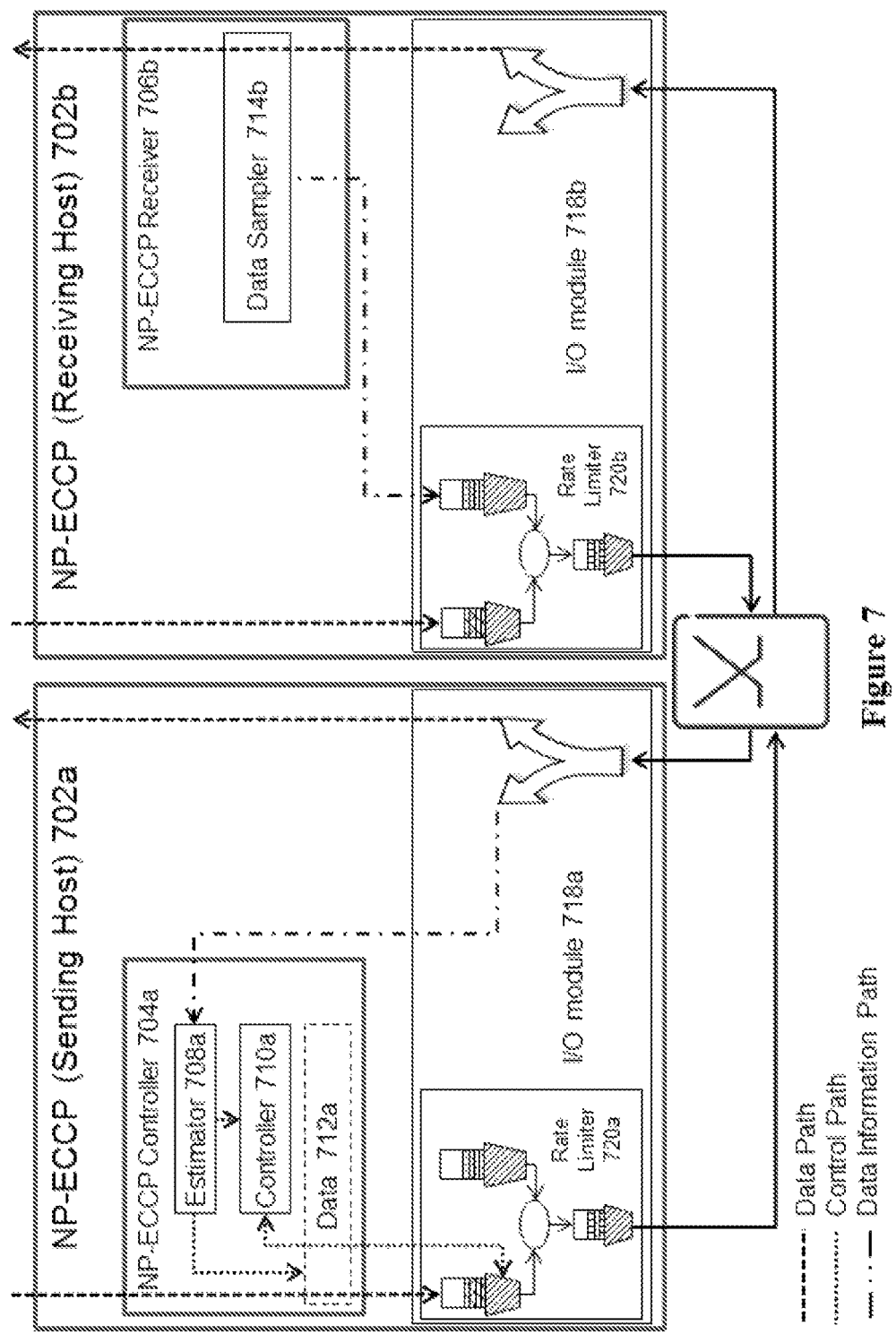
FIG. 7 illustrates an example no probe ECCP architecture.

FIG. 7 illustrates an example NP-ECCP architecture. It will be noted that NP-ECCP does not use probe generator and that the estimator can be modified to forward the $F_b$ information to the local controller instead of sending feedback to the paired line card as was the case in FIG. 1. Similar to the embodiment of FIG. 2, FIG. 7 illustrates an exemplary scenario where the (left) sending host sends data to the (right) receiving host. FIG. 7 shows only the NP-ECCP Controller 704a portion of the sending host NP-ECCP module 702a and the NP-ECCP Receiver 706b portion of the receiving host NP-ECCP module 702b for illustrative purposes of the interaction between the sub-components of the NP-ECCP system. The sending host NP-ECCP Receiver 706a and the receiving host NP-ECCP Controller 704b are not shown as they are not active in this embodiment. Both sending and receiving hosts have I/O modules 718a/718b that include rate limiters 720a/720b.

At the sender side 702a, the NP-ECCP Controller 704a can keep track of information such as the FCS and the sending time of the last H number of packets. In some embodiments, this information can be stored in data storage 712a. In other embodiments, this type of information can be appended to the packet(s) and need not be stored at the sending node 702a. At the receiving side 702b, the NP-ECCP Receiver 706b is configured to sample the data based on a Byte counter. The sampling Byte counter $BC^r$ is taken in this example to be equal to 30000 Bytes. Note that the sampling is based on Byte counter instead of a timer, which achieves fairness by generating more feedback messages for the high rate flows. Once the counter expires, the data sampler 714b encapsulates the FCS and the receiving time of the last N frames in an Ethernet frame that is sent towards the sending host over the network. When the NP-ECCP estimator 708a receives this information from the receiver 706b, it searches in its data history 712a for information of the last H packets for the sending times of these N frames. Then it can calculate the delay using the sending time from its data history 712a and the receiving time from the information received. Next, the NP-ECCP estimator 708a can estimate the link utilization using the mechanism discussed above and calculate a feedback value $F_b$ (e.g. using Equation 8). Finally, it can forward the calculated $F_b$ to the NP-ECCP rate controller 710a to control the sending rate via rate limiter 720a.

Figure 8A:
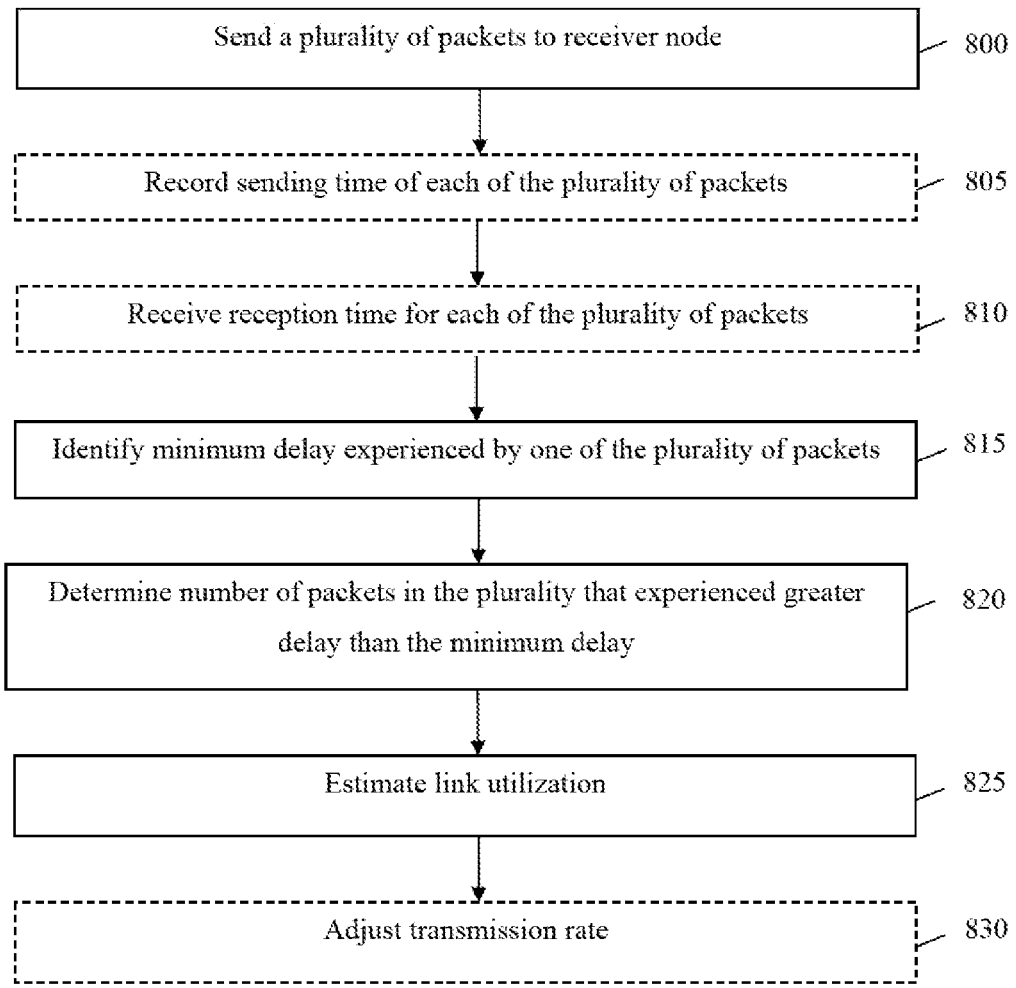
FIG. 8a is a flow chart illustrating a method for estimating link utilization at a sending node.

FIG. 8a is a flow chart illustrating a method for adjusting a data transmission rate. The method of FIG. 8a can be implemented by a controller, such as a NP-ECCP controller, at a sending node in a communication network. The method begins by sending a plurality of packets to a receiver/destination node in the network (block 800). In some embodiments, the packets can be data frames.

The sending time of each of the packets can be recorded and stored by the sending node (block 805) in its data history, for example. The sending time can be recorded along with a frame identifier, such as a frame check sequence. Other examples of a frame identifier include using other fields from the upper layers, such as the Identification field (layer 3) in IPv4, or sequence number (layer 4) in TCP. In some embodiments, the sending time can be stored for a predetermined number of packets in the plurality. The predetermined number of packets can refer to the most recently sent packets.

In an alternative embodiment, the sending time of the packet may not be recorded and stored by the sending node. Optionally, the sending time can be appended to the packet itself as metadata. For example, the metadata can be included as a header extension in IPv6 or an option field in IPv4. In this case, the congestion estimation computation can alternatively be performed at the receiving node, as opposed to the sending node, as all information required is carried by the packet itself and storing of the sending time at the source is no longer required.

In some embodiments, the reception time for the plurality of packets can be recorded and received from the receiving node (block 810).

The sending time information and the receiving time information can be compared to determine the delay experienced by each packet in the plurality. This calculation can be used to identify the minimum delay experienced by any one or more of the packets in the plurality (block 815). A packet that has experienced only the minimum amount of delay can be considered to have experienced no queueing delay. The step of identifying the minimum delay can optionally be performed by either of the sending node or the receiving node. If performed by the receiving node, the result can be transmitted to the sending node.

The number of packets in the plurality that experienced greater than the minimum delay can then be determined (block 820). A percentage of the packets in the plurality that experienced greater than the minimum delay can also be determined. A packet that has experienced greater than the minimum amount of delay can be considered to have experienced queueing delay. The path or link utilization (e.g. between the sending node and the receiving node) can be estimated based at least partially on the number of packets in the plurality that experienced greater than the minimum delay (block 825). The step of estimating link utilization can optionally be performed by either of the sending node or the receiving node. If performed by the receiving node, the result can be transmitted to the sending node. The estimated link utilization can be forwarded to a rate controller mechanism to adjust the transmission rate (of the data and/or the probe train) in accordance with the link utilization estimate (block 830). In some embodiments, the link utilization estimation can be used to calculate a rate adjustment indicator, such as the feedback value discussed herein. The rate adjustment indicator can, in turn, be used to adjust the transmission rate (block 830).

Figure 8B:
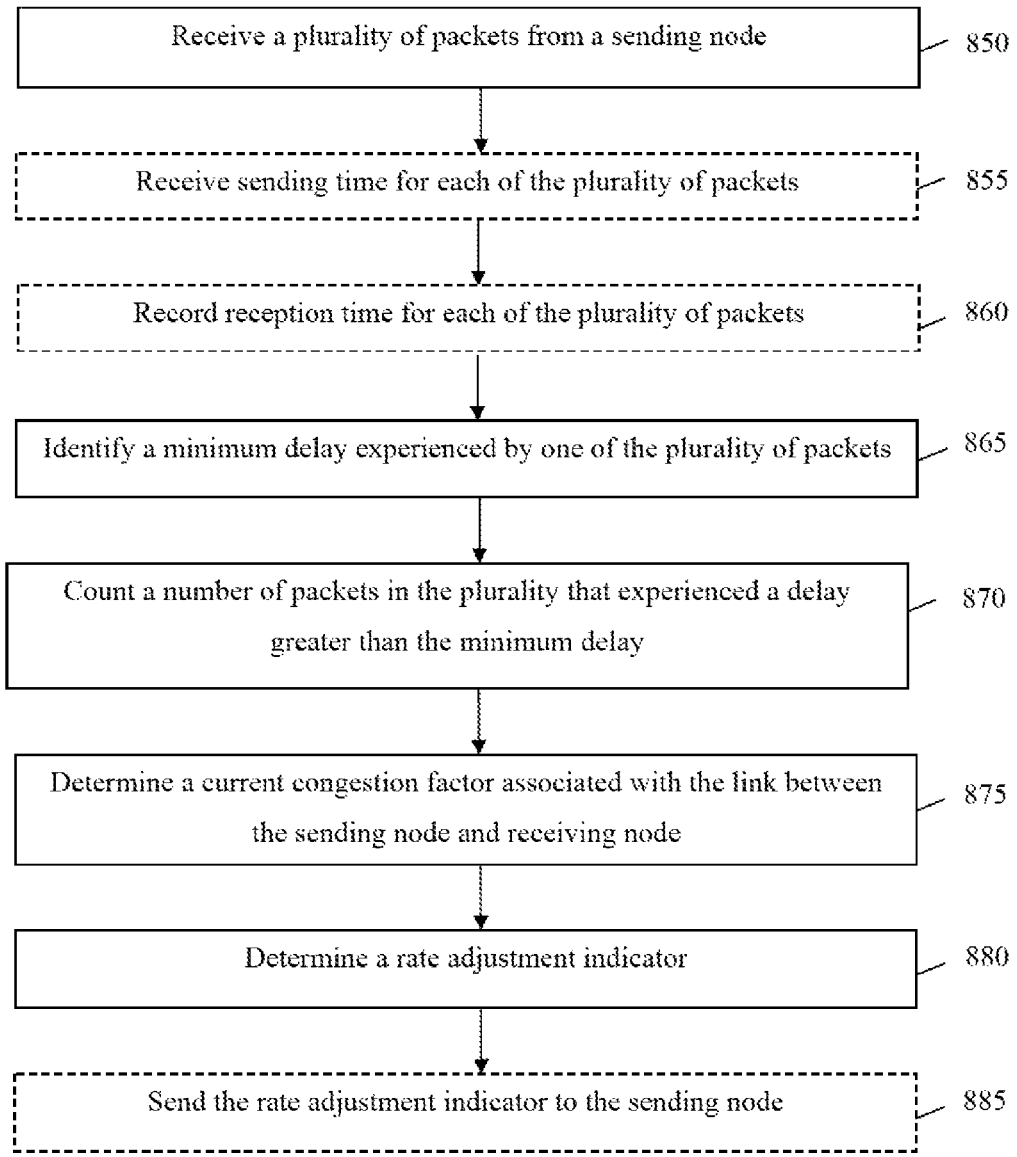
FIG. 8b is a flow chart illustrating a method for estimating congestion at a receiving node.

FIG. 8b is a flow chart illustrating a method for estimating congestion associated with a network path between a sending node and a receiving node. The method of FIG. 8b can be implemented by a receiver, such as a NP-ECCP receiver, at a receiving node in a communication network. A network path can be composed of a set of one or links between the sending and receiving nodes. The method begins by receiving a plurality of packets from a sending node (block 850). In some embodiments, a sending time for each of packets is also received (block 855). The sending time can be included in the packet itself, or can be received via an additional message. Optionally, the reception time for each of the plurality of packets can be recorded by the receiving node (block 860).

The minimum delay experienced by at least one of the plurality of packets is identified (block 865). The delay experienced by each packet can be calculated in accordance with its sending time and reception time. The calculated delays can be compared, and thus, the minimum delay experienced by a packet in the plurality of packets can be identified. A packet that has experienced the minimum delay can be considered a packet that has experienced no delay queueing.

The number of packets in the plurality that experienced a delay greater than the minimum delay is counted (block 870). A packet that has experienced delay greater than the minimum delay can be considered a packet that has experienced delay queueing. In some embodiments, the delay experienced by a packet can be normalized with respect to its packet size. Techniques such as those describe with respect to Equation 7 can be used for normalizing a packet's delay to its length.

A current congestion factor associated with the path between the sending node and the receiving node can be determined (block 875). This determination can be made in accordance with the number of packets that experienced a delay greater than the minimum delay. The current congestion factor can indicate how close the utilization of the path, or link, is to full utilization.

A rate adjustment indicator can be determined based at least in part on the current congestion factor (block 880). In some embodiments, the rate adjustment indicator can be determined based on at least one previously determined congestion factor. The rate adjustment indicator can indicate a trend of the current congestion factor relative to a previous congestion factor.

Optionally, the rate adjustment indicator can be transmitted to the sending node (block 885). The rate adjustment indicator can be sent to the sending node to control a transmission rate of the sending node. The rate adjustment indicator can indicate if the transmission rate of the sending node should be increased or decreased.

Some congestion control mechanisms react per packet, while most network devices are bit-congestible, which means they detect congestion per bit or when their queue level reaches a maximum bit size. Thus, flows with small packet sizes can experience a high number of packet loss as compared to flows with large packet sizes. This can lead to an over-controlling of flows with small packet sizes. Consequently, congestion control mechanisms designed for fixed packet size flows may result in link under-utilization and fairness issues.

Further embodiments can address the effect of different packet sizes and the effect of RTT on congestion control mechanisms. A heterogeneous flow congestion control mechanism can be designed to provide (i) small queue length, (ii) low latency, (iii) high throughput, (iv) with no switch modification, (v) fairness between flows of different packet sizes, and (vi) fairness between flows of different RTTs. Some embodiments can detect congestion by detecting the variation of one-way delay (OWD), then sending back a congestion notification message (CNM) to the source responsible for the congestion to reduce its transmission rate.

Figure 9:
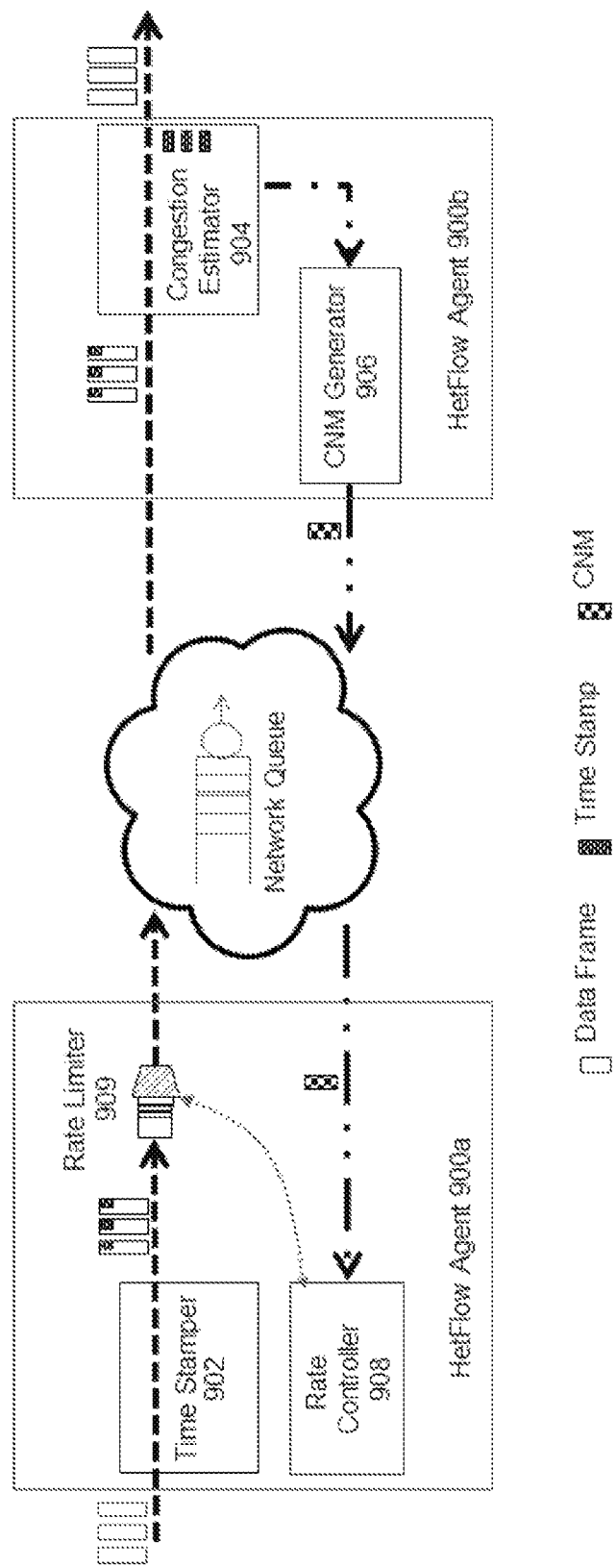
FIG. 9 illustrates an example heterogeneous flow congestion control architecture.

FIG. 9 illustrates an example of a heterogeneous flow congestion control mechanism for Ethernet networks as a distributed algorithm that can run on end-hosts without the need of switch participation. The main components are illustrated as HetFlow agents 900a and 900b at the sending and receiving hosts respectively.

The heterogeneous flow control cycle starts by agent 900a adding timestamp information to data packets using its Time Stamper 902 component. As previously discussed, a timestamp can be sent with a packet as metadata, for example, as a header extension for IPv6, in the option field for IPv4, as an extension to the Ethernet layer, etc. At the sending node, when the Time Stamper 902 recognizes data going out, it can add time stamp information to each data packet and then send the data towards the receiver.

At the receiver side, the Congestion Estimator 904 samples the received data using a byte counter (BC). It retrieves the sending timestamp information for each of the sampled N packets and matches this information with the receiving timestamp. In one example embodiment, the Congestion Estimator 904 can intercept received data traffic and update the byte counter until it reaches a threshold (e.g.

BC=300 KB). When the byte counter expires, the module retrieves the timestamp information for a sample number of packets (e.g. N=32).

The Congestion Estimator 904 calculates the OWD for each packet within the sample, based on its timestamp information, and then computes the average OWD (d) for the packets in this sample. It can then calculate the delay variation (dv) related to the sampling period (sp):

$$dv = \frac{d - d_{old}}{sp}. \quad (9)$$

where the sampling period (sp) is the time between two samples, and $d_{old}$ is a moving average of the previous OWDs that can be calculated using an exponentially weighted moving average (EWMA) method. An example EWMA method is $d_{old} = w \times d_{old} + (1-w) \times d$, where w=0.8.

In the calculation of delay variation (dv), the average delay difference is divided by sampling time (sp) in order to obtain a congestion estimate that reflects the flow rate regardless of packet sizes. For example, the higher the rate is, the lower the sp will be (e.g. the time between two samples is shorter as the flow is transmitting at high speed). Thus, the larger the delay variation (dv) will be. It will be appreciated that the time between samples will be larger for low rate flows, and smaller for high rate flows. Thus, fairness can be achieved between flows of different packet sizes and the system can converge quicker.

The CNM Generator 906 can then calculate a congestion metric, also referred to as the feedback parameter (Fb), using Equation 10 and sends it back to Rate Controller component 908 in a congestion notification message (CNM):

$$Fb = KC \times dv \quad (10)$$

where KC is a constant (e.g. KC=1500) that is used to scale the dv values to the Fb range, similar to as in QCN ([−64. 64]). It will be appreciated by those skilled in the art that the feedback parameter Fb is similar to that of the ECCP and NP-ECCP embodiments discussed herein, to be returned to the sending node and used to adjust the sending rate. It follows that Fb will be larger for higher rate flows and smaller for low rate flows. This setting of Fb allows for a faster convergence of the system to the fair share of the link capacity.

In some embodiments, the congestion metric is only sent to the Rate Controller 908 if it is greater than zero. The Rate Controller 908 can use this information to control the Rate Limiter 909 of the sending node.

For a more aggressive control of the sending rate, the byte counter (e.g. the BC value) can be adjusted to be made smaller for a higher frequency of periodic sampling. Further, a larger KC value can be used to lead to a more aggressive Fb.

Figure 10:
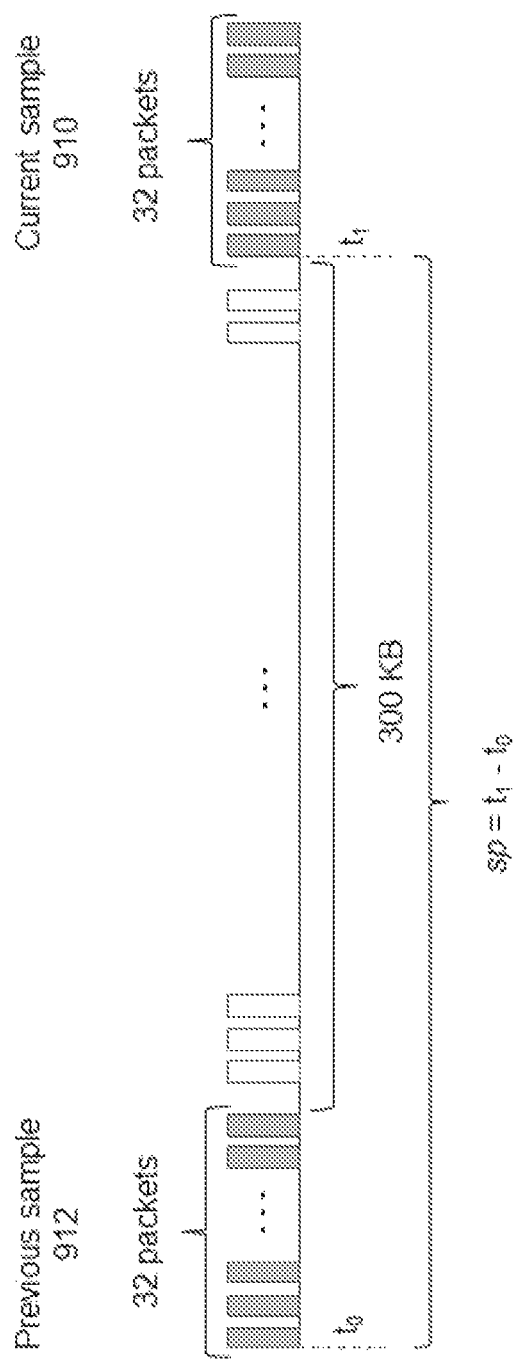
FIG. 10 illustrates an example data sampling process.

FIG. 10 illustrates an example data sampling embodiment that can be implemented at a receiving node. At time $t_1$, a current sample 910 of packets are received. In this example, N=32 packets that will be sampled for the congestion estimation. The current average delay (a) can be calculated for the current sample 910. The current average delay (a) can then be compared to at least one previously calculated average delay ($d_{old}$) to determine to the delay variation (dv). In this example, a previous sample 912 of packets was received at time to and the previous average delay ($d_{old}$) was calculated for sample 912. The time between samples 910 and 912 (sp) can be calculated as the difference between $t_1$ and $t_0$. Accordingly, the delay variation can be determined using Equation 9.

In some embodiments, $d_{old}$ can based on more than one previously calculated average delay, such as a moving average of previous average delays, as has been described above.

It will be appreciated that, in the example of FIG. 10, the congestion estimator is configured to sample data every 300 KB (e.g. BC=300 KB). In other words, 32 packets are sampled every 300 KB. The byte counter can be configured to sample data more or less frequently as desired. Similarly, the number of packets in a sample can also be configured.

Figure 11:
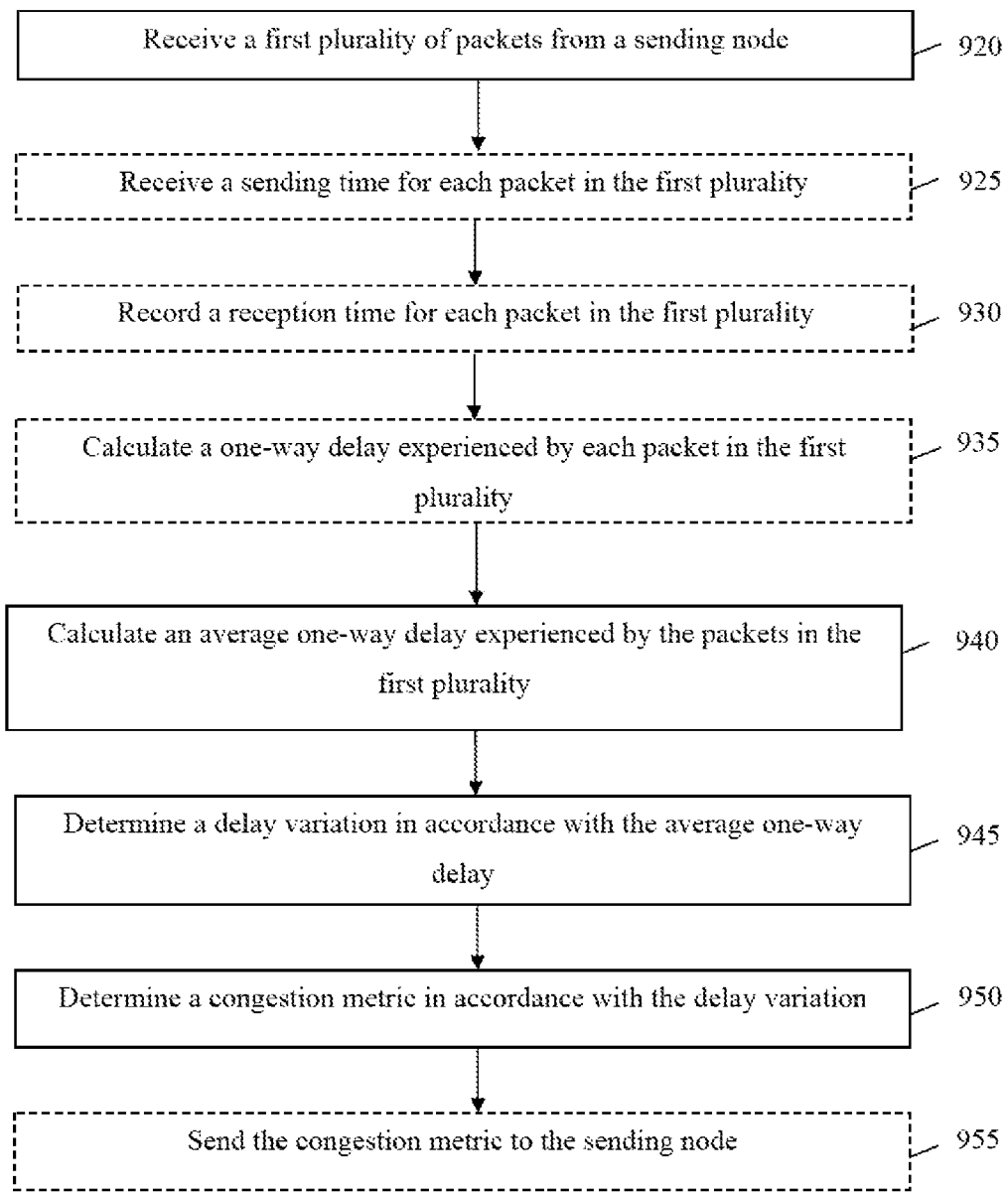
FIG. 11 is a flow chart illustrating a method for determining a congestion metric at a receiving node.

FIG. 11 is a flow chart illustrating a method for determining a congestion metric associated with a network path between a sending node and a receiving node. The method of FIG. 11 can be implemented by a receiver component, such as a HetFlow agent, at a receiving node in a communication network. A network path can be composed of a set of one or links between the sending and receiving nodes. The method begins by receiving a first plurality of packets from a sending node (block 920). The first plurality of packets can be considered a current sample of packets received from the sending node. In some embodiments, a sending time for each of the packets is also received (block 925). The sending time can be included in the packet itself, or alternatively can be received via an additional message. In some embodiments, the reception time for each of the plurality of packets can be obtained or recorded by the receiving node (block 930). The one-way delay experienced by each packet (e.g. between the sending node and receiving node) can thus be calculated for each of the packet (block 935) in accordance with its sending time and reception time. The average one-way delay experienced by the packets in the first plurality can be then be calculated (block 940).

A delay variation is determined in accordance with the average one-way delay (block 945). The delay variation can be determined further in accordance with at least one previously calculated average one-way delay associated with a previous sample of packets. In some embodiments, a moving average of previously calculated average delays can be used. The delay variation can be determined further in accordance with the duration of time between the samples. The delay variation can be thought of as the "trend" in average delay over time, or relative to one or more previous average delay(s). For example, the average delay experienced by a plurality of packets can increase, decrease or remain constant for samples taken at time $t_0$ to $t_1$ and so on.

In one embodiment, the delay variation can be calculated in accordance with a difference between a first (e.g. current) average delay and a second (e.g. previous) average delay. The first average delay can be associated with a first sample of packets and the second average delay can be associated with one or more second samples of packets. The difference between the first average delay and the second average delay can be divided by the duration of time between the first sample and the previous sample to calculate the delay variation.

A congestion metric is determined in accordance with the delay variation (block 950). A scaling factor can be applied to the delay variation determine the congestion metric. In some embodiments, the congestion metric is transmitted to the sending node (block 955). The congestion metric can be sent to the sending node in order to control a transmission rate of the sending node. The congestion metric can indicate if the transmission rate of the sending node should be modified. In some embodiments, the congestion metric is transmitted to the sending node in response to determining that the congestion metric is greater than zero.

It will be appreciated that, in some embodiments, one delay variation calculation and one congestion metric calculation are performed for each sampling period. As such, one congestion metric can be fed back to the sending node per sample.

Figure 12:
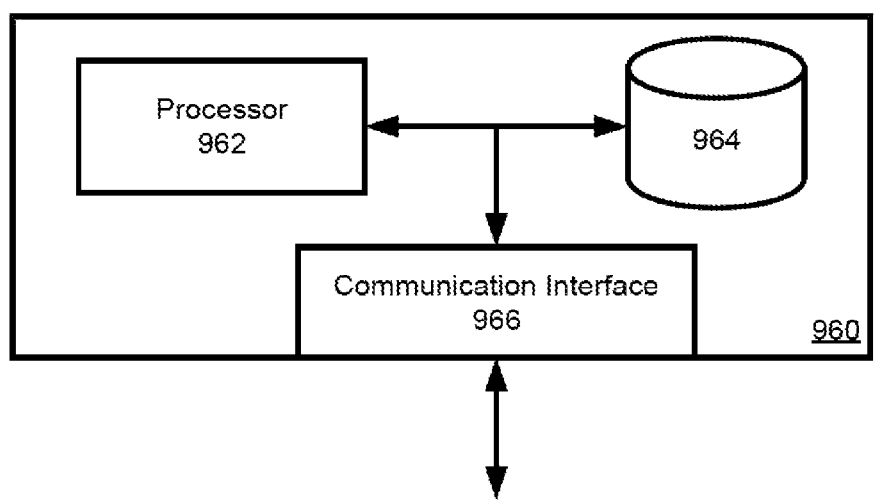
FIG. 12 is a block diagram illustrating an example network node.

FIG. 12 is a block diagram illustrating an example network node 960 according to embodiments of the present invention. Network node 960 can be any of the source nodes (sending host) and/or destination nodes (receiving host) as have been described herein. In some embodiments, network element 960 can be an Ethernet bridge or router. The network node 960 comprises circuitry including a processor 962, a memory or instruction repository 964 and a communication interface 966. The communication interface 966 can include at least one input port and at least one output port. The memory 964 contains instructions executable by the processor 962 whereby the network node 960 is operable to perform the various embodiments as described herein. In some embodiments, the network node 960 can be a virtualized application hosted by the underlying physical hardware. Network node 960 can be configured to implement the methods and procedures illustrated in FIGS. 1-11.

The processor 962 can include any suitable combination of hardware to execute instructions and manipulate data to perform some or all of the described functions of node 960. In some embodiments, the processor 962 may include, for example, one or more computers, one or more central processing units (CPUs), one or more microprocessors, one or more application specific integrated circuits (ASICs), one or more field programmable gate arrays (FPGAs) and/or other logic.

The memory 964 is generally operable to store instructions, such as a computer program, software, an application including one or more of logic, rules, algorithms, code, tables, etc. and/or other instructions capable of being executed by a processor. Examples of memory 964 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 962 of node 960.

Other embodiments of network node 960 may include additional components beyond those shown in FIG. 12 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different networking and/or radio access technologies, or may represent partly or entirely different physical components.

In some embodiments, network node 960 is operative to estimate congestion associated with a network path between a sending node and a receiving node. Network node 960 is configured to receive, via communication interface 966, a plurality of packets from a sending node and calculate, for each packet, a delay experienced by the packet between the sending node and receiving node. An average delay experienced by the packets in the plurality can be determined. A variation in the average delay can be calculated and used to determine a congestion metric for the network path. The network node 960 can transmit the congestion metric to the sending node for use in controlling its sending rate.

Figure 13:
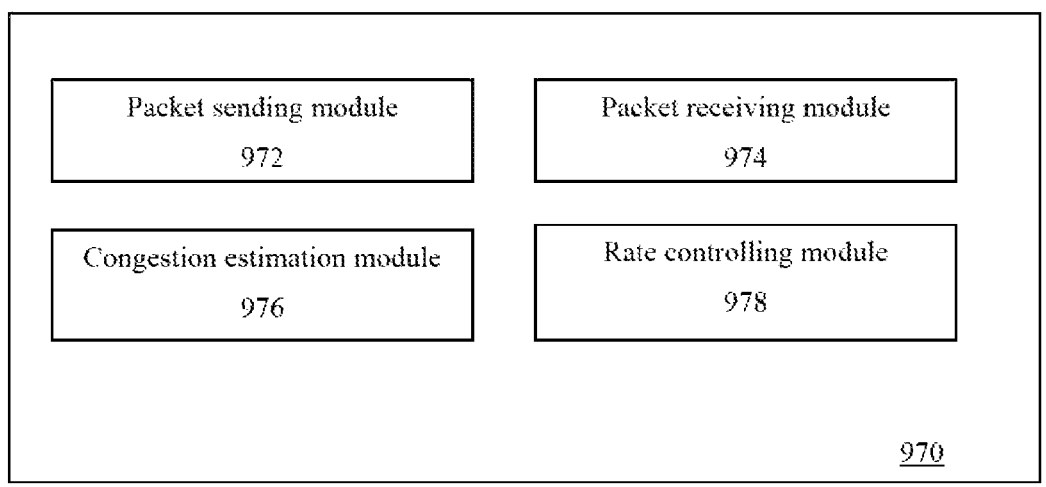
FIG. 13 is a block diagram illustrating an example network node with modules.

In some embodiments, a node may comprise a series of modules configured to implement the functionalities of the nodes described above. FIG. 13 is a block diagram of an example network node 970 configured to determine a congestion metric associated with a link between a sending node and a receiving node. The node 970 can include a packet sending module 972, a packet receiving module 974, a congestion estimation module 976, and a rate controlling module 978.

It will be appreciated that the various modules may be implemented as combination of hardware and software, for instance, the processor, memory and/or communication interface(s) of node 960 shown in FIG. 12. Some embodiments may also include additional modules to support additional and/or optional functionalities.

The node 970 can be configured to implement the methods and procedures illustrated in FIGS. 1-11. Packet sending module 972 can be configured to send a plurality of packets. Packet sending module 972 can be configured to add timestamp information to packets prior to sending. Packet receiving module 974 can be configured to receive a plurality of packets during a sampling period. Congestion estimation module 976 can be configured to determine a congestion metric in accordance with a delay variation between the average delay experienced by the packets in the plurality and a previously calculated average delay for a previous sampling period. Rate controlling module 978 can be configured to determine a congestion metric associated with the network path in accordance with the delay variation, and to transmit the congestion metric to the sending node. The sending rate of the packet sending module 972 can be adjusted in accordance with a received congestion metric.

Embodiments of the invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for estimating congestion associated with a network path between a sending node and a receiving node, the method performed by the receiving node, the method comprising:
   receiving a first plurality of packets from the sending node;
   calculating a first average delay experienced by the packets in the first plurality;
   determining a delay variation in accordance with a difference between the first average delay and a second average delay associated with a second plurality of packets previously received from the sending node, divided by a duration of time between reception of the first plurality of packets and reception of the second plurality of packets, wherein the delay variation indicates a trend in the average delay associated with the network path over time;
   determining a congestion metric associated with the network path in accordance with the delay variation; and
   transmitting the congestion metric to the sending node.

2. The method of claim 1, wherein the delay variation indicates a trend in the average delay relative to at least one previously calculated average delay.

3. The method of claim 1, wherein each packet in the plurality includes an indication of a sending time of the packet.

4. The method of claim 1, further comprising, recording a reception time for each packet in the plurality.

5. The method of claim 1, further comprising, calculating a delay experienced by each packet in the plurality in accordance with a sending time and a reception time for the packet.

6. The method of claim 1, wherein the congestion metric indicates that the transmission rate of the sending node should be modified.

7. The method of claim 1, wherein the congestion metric is sent to the sending node to control a transmission rate of the sending node.

8. The method of claim 1, further comprising, transmitting the congestion metric to the sending node responsive to determining that the congestion metric is greater than zero.

9. A network node comprising circuitry including a processor and a memory, the memory containing instructions executable by the processor whereby the network node is operative to:
   receive a first plurality of packets from a sending node;
   calculate a first average delay experienced by the packets in the first plurality;
   determine a delay variation in accordance with a difference between the first average delay and a second average delay associated with a second plurality of packets previously received from the sending node, divided by a duration of time between reception of the first plurality of packets and reception of the second plurality of packets, wherein the delay variation indicates a trend in the average delay associated with a network path over time;
   determine a congestion metric associated with the network path in accordance with the delay variation; and
   transmit the congestion metric to the sending node.

10. The network node of claim 9, wherein the delay variation indicates a trend in the average delay relative to at least one previously calculated average delay.

11. The network node of claim 9, wherein each packet in the plurality includes an indication of a sending time of the packet.

12. The network node of claim 9, further operative to record a reception time for each packet in the plurality.

13. The network node of claim 9, further operative to calculate a delay experienced by each packet in the plurality in accordance with a sending time and a reception time for the packet.

14. The network node of claim 9, wherein the congestion metric indicates that the transmission rate of the sending node should be modified.

15. The network node of claim 9, wherein the congestion metric is sent to the sending node to control a transmission rate of the sending node.

16. The network node of claim 9, further operative to transmit the congestion metric to the sending node responsive to determining that the congestion metric is greater than zero.

17. A computer readable storage medium storing executable instructions, which when executed by a processor, cause the processor to:
   receive a first plurality of packets from a sending node;
   calculate a first average delay experienced by the packets in the first plurality;
   determine a delay variation in accordance with a difference between the first average delay and a second average delay associated with a second plurality of packets previously received from the sending node, divided by a duration of time between reception of the first plurality of packets and reception of the second plurality of packets, wherein the delay variation indicates a trend in the average delay associated with a network path over time;
   determine a congestion metric associated with the network path in accordance with the delay variation; and
   transmit the congestion metric to the sending node.

* * * * *